United States Patent
Hull et al.

(10) Patent No.: US 9,863,231 B2
(45) Date of Patent: Jan. 9, 2018

(54) FRACTURING FLUID FOR SUBTERRANEAN FORMATIONS

(71) Applicant: Aramco Services Company, Houston, TX (US)

(72) Inventors: Katherine L. Hull, Houston, TX (US); Mohammed Sayed, Houston, TX (US); Ghaithan A. Al-Muntasheri, Katy, TX (US)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 14/955,180

(22) Filed: Dec. 1, 2015

(65) Prior Publication Data

US 2016/0153274 A1 Jun. 2, 2016

Related U.S. Application Data

(60) Provisional application No. 62/085,806, filed on Dec. 1, 2014.

(51) Int. Cl.
| | |
|---|---|
| *E21B 43/267* | (2006.01) |
| *C09K 8/80* | (2006.01) |
| *C04B 28/00* | (2006.01) |
| *E21B 43/26* | (2006.01) |
| *C09K 8/66* | (2006.01) |
| *C04B 28/26* | (2006.01) |
| *C09K 8/46* | (2006.01) |

(52) U.S. Cl.
CPC .......... *E21B 43/267* (2013.01); *C04B 28/006* (2013.01); *C04B 28/26* (2013.01); *C09K 8/46* (2013.01); *C09K 8/665* (2013.01); *C09K 8/80* (2013.01); *E21B 43/26* (2013.01); *C09K 2208/08* (2013.01); *Y02P 40/165* (2015.11); *Y02W 30/92* (2015.05); *Y02W 30/93* (2015.05); *Y02W 30/94* (2015.05)

(58) Field of Classification Search
None
See application file for complete search history.

(56) References Cited

U.S. PATENT DOCUMENTS

| | | | | |
|---|---|---|---|---|
| 3,208,522 | A * | 9/1965 | Roebuck | C09K 8/62 166/276 |
| 3,654,991 | A * | 4/1972 | Harnsberger | E21B 43/261 166/281 |
| 3,654,992 | A * | 4/1972 | Harnsberger | C09K 8/80 166/281 |
| 5,544,705 | A * | 8/1996 | Jones | E21B 27/02 166/155 |
| 6,869,473 | B2 | 3/2005 | Comrie | |
| 6,902,002 | B1 * | 6/2005 | Chatterji | C04B 28/02 106/696 |
| 7,044,224 | B2 * | 5/2006 | Nguyen | C09K 8/665 106/600 |
| 7,160,844 | B2 | 1/2007 | Urbanek | |
| 7,491,444 | B2 | 2/2009 | Smith et al. | |
| 7,745,363 | B2 | 6/2010 | Beall et al. | |
| 7,794,537 | B2 | 9/2010 | Barlet-Gouedard et al. | |
| 7,846,250 | B2 | 12/2010 | Barlet-Gouedard et al. | |
| 7,867,613 | B2 | 1/2011 | Smith et al. | |
| 8,202,362 | B2 | 6/2012 | Davidovits et al. | |
| 8,535,437 | B2 * | 9/2013 | Pershikova | C04B 12/005 106/729 |
| 8,574,358 | B2 | 11/2013 | Biscan et al. | |
| 8,603,578 | B2 | 12/2013 | Smith et al. | |
| 2004/0177957 | A1 * | 9/2004 | Kalfayan | C09K 8/5083 166/270 |
| 2004/0261999 | A1 * | 12/2004 | Nguyen | C09K 8/665 166/292 |
| 2005/0000734 | A1 * | 1/2005 | Getzlaf | C04B 12/005 175/73 |
| 2005/0096207 | A1 * | 5/2005 | Urbanek | C04B 33/1328 501/6 |
| 2006/0113080 | A1 * | 6/2006 | Nguyen | C09K 8/665 166/308.1 |
| 2006/0169449 | A1 * | 8/2006 | Mang | C09K 8/467 166/278 |
| 2008/0028994 | A1 * | 2/2008 | Barlet-Gouedard | C04B 28/006 106/811 |
| 2008/0028995 | A1 * | 2/2008 | Barlet-Gouedard | C04B 28/006 106/811 |

(Continued)

FOREIGN PATENT DOCUMENTS

| | | |
|---|---|---|
| CN | 101570425 A | 11/2009 |
| EP | 2093200 A1 | 8/2009 |
| WO | 2008017414 A1 | 2/2008 |
| WO | 2008117222 A1 | 10/2008 |

OTHER PUBLICATIONS

Material Safety Data Sheet Sodium Silicate; Oct. 9, 2005; http://www.sciencelab.com/msds.php?msdsId=9925036; pp. 1-5.*

(Continued)

*Primary Examiner* — Anuradha Ahuja
(74) *Attorney, Agent, or Firm* — Bracewell LLP; Constance Gall Rhebergen

(57) ABSTRACT

A method of fracturing a reservoir comprising the steps of pumping a geopolymer precursor fluid through a wellbore into the reservoir at a fracture pressure, the geopolymer precursor fluid at the fracture pressure generates fractures in the reservoir, wherein the geopolymer precursor fluid is comprised of an amount of aluminosilicate, an amount of alkaline reagent, and a permeability enhancer, allowing the geopolymer precursor fluid to fill the fractures in the reservoir, shutting-in the wellbore at a wellbore pressure, the wellbore pressure maintains the geopolymer precursor fluid in the fractures, allowing the geopolymer precursor fluid to harden for a hardening time to form a geopolymer in the fractures, the geopolymer has a geopolymer matrix, the geopolymer matrix has a permeability, the geopolymer has a compressive strength, and reducing the wellbore pressure allows a reservoir fluid to flow from the reservoir through the geopolymer matrix of the geopolymer to the wellbore.

19 Claims, No Drawings

(56) References Cited

U.S. PATENT DOCUMENTS

| | | | |
|---|---|---|---|
| 2009/0139719 A1* | 6/2009 | Luo | C04B 18/021 |
| | | | 166/280.2 |
| 2010/0119426 A1* | 5/2010 | Jinguo | C01B 33/12 |
| | | | 423/131 |
| 2011/0073311 A1* | 3/2011 | Porcherie | C04B 28/006 |
| | | | 166/305.1 |
| 2011/0077176 A1 | 3/2011 | Smith et al. | |
| 2011/0284223 A1 | 11/2011 | Porcherie et al. | |
| 2012/0192765 A1 | 8/2012 | Huynh | |
| 2012/0260829 A1* | 10/2012 | Pershikova | C04B 12/005 |
| | | | 106/804 |
| 2013/0019780 A1 | 1/2013 | Karimi et al. | |
| 2013/0233545 A1* | 9/2013 | Mahoney | C09K 8/80 |
| | | | 166/280.2 |
| 2013/0341024 A1* | 12/2013 | Fonseca | E21B 43/261 |
| | | | 166/281 |
| 2014/0144635 A1* | 5/2014 | Nguyen | E21B 43/267 |
| | | | 166/281 |
| 2014/0318786 A1* | 10/2014 | Vidma | C09K 8/665 |
| | | | 166/293 |
| 2015/0284291 A1* | 10/2015 | Honert | C04B 28/02 |
| | | | 106/708 |

OTHER PUBLICATIONS

PCT International Search Report and the Written Opinion of the International Searching Authority dated Feb. 10, 2016; International Application No. PCT/US2015/063092; International Filing Date: Dec. 1, 2015.

\* cited by examiner

FRACTURING FLUID FOR SUBTERRANEAN FORMATIONS

RELATED APPLICATION

This application claims priority from U.S. Provisional Patent Application No. 62/085,806 filed on Dec. 1, 2014. For purposes of United States patent practice, this application incorporates the contents of the Provisional Patent Application by reference in its entirety.

TECHNICAL FIELD OF THE INVENTION

The present invention relates to a composition and method for fracturing a reservoir. More specifically, the present invention relates to compositions and methods for fracturing a reservoir and in situ proppant generation using geopolymer materials.

BACKGROUND OF THE INVENTION

Hydraulic fracturing is an important step in producing oil and gas from hydrocarbon reservoirs. Traditional fracturing uses water-based fluids at high pressures to create fractures in the reservoir. Viscous fluids, such as crosslinked gels, are then pumped into the fractures carrying a suspension of proppants. The proppants serve to prevent the fractures from re-closing due to the pressure of the earth, in other words, the proppants keep the fractures open. Proppants are solid particles, such as sand or ceramics, that easily fit into the fractures. Traditional proppants have a compressive strength in the range of 1,000 to 15,000 psi. Keeping the fractures open is important as the fractures provide the conductive path through which the oil and gas can flow from the reservoir to the wellbore and the surface. After the viscous fluids carry the proppants into the fracture, the viscous fluids are allowed to flow back into the wellbore leaving the proppants behind.

Traditional fracturing fluids, including the viscous proppant laden fluids have a number of disadvantages. First, traditional fracturing with traditional proppants requires multiple injections (multi-injections), which increases the time required to fracture and place proppant. Multi-injections can also increase the chances for error, expenses, and problems to be introduced. Second, the viscous fluids can deposit solid residues from the crosslinked gels along the fractures, formation walls, or proppant packs. The deposits of solid residue can restrict the flow of oil and gas from the reservoir. Third, the proppant itself may agglomerate or pack together presenting an obstacle in a fracture through which the oil or gas is prevented from passing. Further, placement of the proppant in the fractures can be more of an art than a science, in such that the proppant may not be placed in the fracture as desired or may be screened out during the fracturing process. Finally, the proppant can experience embedment in the formation. Other concerns relate to the growing public anxieties related to the potential environmental impact of traditional hydraulic fracturing fluids, both to the significant amount of water used and from the concerns of contamination of the water table.

A method that provides for a one-step injection to fracture a reservoir and keep the fractures open without the disadvantages of traditional proppants is desired.

SUMMARY OF THE INVENTION

The present invention relates to a composition and method for fracturing a reservoir. More specifically, the present invention relates to compositions and methods for fracturing a reservoir and in situ proppant generation using geopolymer materials.

In one aspect of the present invention, a method of fracturing a reservoir is provided. The method includes the steps of pumping a geopolymer precursor fluid through a wellbore into the reservoir at a fracture pressure, wherein the geopolymer precursor fluid at the fracture pressure generates fractures in the reservoir, wherein the geopolymer precursor fluid includes an amount of aluminosilicate, an amount of alkaline reagent, and a permeability enhancer, allowing the geopolymer precursor fluid to fill the fractures in the reservoir, shutting-in the wellbore at a wellbore pressure, wherein the wellbore pressure is operable to maintain the geopolymer precursor fluid in the fractures, allowing the geopolymer precursor fluid to harden for a hardening time to form a geopolymer in the fractures, wherein the geopolymer has a geopolymer matrix, wherein the geopolymer matrix has a permeability, wherein the geopolymer has a compressive strength, and reducing the wellbore pressure, wherein reducing the wellbore pressure is operable to allow a reservoir fluid to flow from the reservoir through the geopolymer matrix of the geopolymer to the wellbore.

In certain aspects of the present invention, the amount of aluminosilicate is selected from the group consisting of calcined clays, kaolinitic clays, lateritic clays, volcanic rocks, mine tailings, blast furnace slag, coal fly ash, and combinations thereof. In certain aspects of the present invention, the amount of alkaline reagent is selected from the group consisting of sodium silicate solution and potassium silicate solution.

In certain aspects of the present invention, the permeability enhancer is polylactic acid fibers. In certain aspects of the present invention, the hardening time is controlled using an accelerator. In certain aspects of the present invention, wherein the hardening time is controlled using a retarder. In certain aspects of the present invention, the compressive strength is greater than the overburden pressure of the reservoir. In certain aspects of the present invention, the compressive strength is in the range between 3,000 psi and 20,000 psi. In certain aspects of the present invention, the permeability is in the range of 0.1 mD to 2,000 mD.

In a second aspect of the present invention, a method of generating a geopolymer with a geopolymer matrix in situ in fractures in a reservoir is provided. The method includes the steps of mixing an amount of aluminosilicate and an amount of alkaline reagent to form a geopolymer precursor fluid, wherein the geopolymer precursor fluid has a precursor viscosity, wherein the geopolymer precursor fluid has an Si to Al ratio, pumping the geopolymer precursor fluid through a wellbore into the reservoir at a fracture pressure to generate the fractures in the reservoir, wherein the geopolymer precursor fluid is operable to fill the fractures, allowing the geopolymer precursor fluid to harden for a hardening time to form the geopolymer in the fractures, the geopolymer having the geopolymer matrix, wherein the geopolymer matrix has a permeability, wherein the geopolymer has a compressive strength, wherein the geopolymer precursor fluid is not pumped into the reservoir during the hardening time, and reducing the pressure in the wellbore, wherein reducing the pressure in the wellbore is operable to allow reservoir fluids to flow from the reservoir through the geopolymer matrix of the geopolymer to the wellbore.

In certain aspects of the present invention, the Si to Al ratio is in the range between 0.5:1 and 2:1. In certain aspects of the present invention, the precursor viscosity is in the range between 10 cP and 400 cP. In certain aspects of the present invention, the hardening time is controlled using an accelerator. In certain aspects of the present invention, the hardening time is controlled using a retarder. In certain aspects of the present invention, the permeability is in the range of 0.1 mD to 2,000 mD. In certain aspects of the present invention, the compressive strength is greater than the overburden pressure of the reservoir. In certain aspects of the present invention, the compressive strength is in the range between 3,000 psi and 20,000 psi. In certain aspects of the present invention, the geopolymer precursor fluid further comprises a permeability enhancer. In certain aspects of the present invention, the permeability enhancer is polylactic acid fibers. In certain aspects of the present invention, the amount of aluminosilicate is selected from the group consisting of calcined clays, kaolinitic clays, lateritic clays, volcanic rocks, mine tailings, blast furnace slag, coal fly ash, and combinations thereof. In certain aspects of the present invention, the amount of alkaline reagent is selected from the group consisting of sodium silicate solution and potassium silicate solution.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In a method for fracturing a reservoir and keeping the fractures open against an overburden pressure, a geopolymer precursor fluid is mixed on the surface, pumped through the wellbore and into the reservoir to generate fractures in the reservoir. The geopolymer precursor fluid is given time to harden in situ in the fractures forming the geopolymer, the geopolymer contains a geopolymer matrix that has a permeability allowing reservoir fluids to flow through the geopolymer. In one aspect of the invention, a method for generating a geopolymer in situ in a reservoir is provided.

"Geopolymer" as used herein refers to an inorganic polymer formed by aluminosilicate oxide polymerization in the presence of an alkaline reagent. The geopolymers of the present invention can be designed to have a silicon (Si) to aluminum (Al) ratio (Si/Al ratio) in the range between 0.5:1 and 2:1, alternately between 1:1 and 2:1, alternately between 1:1 and 1.5:1, and alternately between 0.5:1 and 1:1. As used herein, "designed" with respect to the geopolymer means tuning or controlling the Si/Al ratio of the final geopolymer composition.

The method of the present invention can be used in any reservoir or formation that can be fractured, and where the fractures improve the production of reservoir fluids. In at least one embodiment of the present invention, the reservoir is a tight reservoir. In at least one embodiment of the present invention, the reservoir is an unconventional reservoir. Exemplary reservoir fluids that can be produced through the method of the present invention include hydrocarbons, such as gas or oil, brine, and water.

The geopolymer precursor fluid is prepared by mixing an amount of the aluminosilicate with an amount of the alkaline reagent. Any method of mixing is suitable for use in the present invention. In at least one embodiment of the present invention, the amount of aluminosilicate and the amount of the alkaline reagent are mechanically mixed. Any aluminosilicate that can be polymerized with an alkaline reagent can be selected. Exemplary aluminosilicates include calcined clays, kaolinitic clays, lateritic clays, volcanic rocks, mine tailings, blast furnace slag, coal fly ash, natural aluminosilicate materials, and combinations thereof. The source of aluminosilicate should be selected in consideration of purity of the source material, color, and particle size. In at least one embodiment of the present invention, the aluminosilicate is metakaolin. Metakaolin has a high rate of dissolution in solution and ability to control ratio of Si to Al. In at least one embodiment, the aluminosilicate is low calcium fly ash (ASTM class F fly ash). In at least one embodiment of the present invention, low calcium fly ash is preferred over high calcium fly ash (ASTM class C fly ash) due to the large amount of calcium in the high calcium fly ash. Without being bound to a particular theory, it is believed a large amount of calcium can interfere with the polymerization process and thus alter the microstructure of the solidified geopolymer. In at least one embodiment of the present invention, a large amount of calcium can produce a geopolymer with higher compressive strength, due to the formation of calcium-aluminium-hydrates and other calcium compounds. In at least one embodiment of the present invention, the aluminosilicate is fly ash. Fly ash can be used as the aluminosilicate because of its fine particle size.

Any alkaline reagent that reacts with an aluminosilicate to produce a geopolymer can be used. Exemplary alkaline reagents include sodium silicate solution, potassium silicate solution, calcium silicate solution, cesium silicate solution, sodium hydroxide, potassium hydroxide, and calcium hydorixde.

In at least one embodiment of the present invention, where the alkaline reagent is sodium silicate solution, the sodium silicate solution is prepared by dissolving amorphous silica ($SiO_2$) in a solution of sodium hydroxide (NaOH) until the solution is clear. The concentration of sodium hydroxide is selected so that the ratio of $SiO_2$ to sodium oxide ($Na_2O$) in the sodium silicate solution is in the range of about 0.5:1 to about 2:1, alternately in the range from about 0.5:1 to about 1:1, alternately in the range from 1:1 to about 2:1, and alternately in the range from about 1.5:1 to about 2:1, where the general formula for sodium silicate is $Na_2O(SiO_2)_n$. In at least one embodiment of the present invention, the alkaline reagent is sodium hydroxide, where the aluminosilicate is mixed with the sodium hydroxide in the absence of amorphous silica dissolved in the sodium hydroxide.

In at least one embodiment of the present invention, where the alkaline reagent is potassium silicate solution, the potassium silicate solution is prepared by dissolving amorphous $SiO_2$ in a solution of potassium hydroxide (KOH) until the solution is clear. The concentration of potassium hydroxide is selected so that the ratio of $SiO_2$ to potassium oxide ($K_2O$) in the potassium silicate solution is in the range of about 0.5:1 to about 2:1, alternately in the range from about 0.5:1 to about 1:1, alternately in the range from 1:1 to about 2:1, and alternately in the range from about 1.5:1 to about 2:1, where the formula for potassium silicate is $K_2O(SiO_2)$. In at least one embodiment of the present invention, the alkaline reagent is potassium hydroxide, where the aluminosilicate is mixed with the potassium hydroxide in the absence of amorphous silica dissolved in potassium hydroxide. In at least one embodiment of the present of invention, the alkaline reagent contains a mixture of sodium silicate solution and potassium silicate solution. Mixing sodium silicate solution and potassium silicate solution as the alkaline reagent can be used to control viscosity and strength of the geopolymer.

In at least one embodiment of the present invention, where the alkaline reagent is calcium silicate solution, the calcium silicate solution is prepared by dissolving amorphous silica ($SiO_2$) in a solution of calcium hydroxide (CaOH) until the solution is clear. The concentration of calcium hydroxide is selected so that the ratio of $SiO_2$ to calcium oxide (CaO) in the sodium silicate solution is in the range of about 0.5:1 to about 2:1, alternately in the range from about 0.5:1 to about 1:1, alternately in the range from 1:1 to about 2:1, and alternately in the range from about 1.5:1 to about 2:1, where the general formula for sodium silicate is $CaO(SiO_2)_n$. In at least one embodiment of the present invention, the alkaline reagent is calcium hydroxide, where the aluminosilicate is mixed with the calcium hydroxide in the absence of amorphous silica dissolved.

In at least one embodiment of the present invention, the amount of aluminosilicate and the amount of the alkaline reagent, where sodium hydroxide is the alkaline reagent, are mixed in stoichiometric amounts so that the ratio of $Al_2O_3$ to $Na_2O$ is 1. In at least one embodiment of the present invention, the amount of aluminosilicate and the amount of the alkaline reagent, where potassium hydroxide is the alkaline reagent, are mixed in stoichiometric amounts so that the ratio of $Al_2O_3$ to $K_2O$ is 1.

In at least one embodiment of the present invention, the geopolymer precursor fluid is liquid. In at least one embodiment of the present invention, the geopolymer precursor fluid is a slurry. In at least one embodiment, the amount of aluminosilicate and the amount of alkaline reagent are mixed at the surface and then pumped into the wellbore to produce the fractures.

The geopolymer precursor fluid has a precursor viscosity. The precursor viscosity is in the range of about 10 cP to about 400 cP, alternately in the range of about 10 cP to about 50 cP, alternately in the range of about 10 cP to about 100 cP, alternately in the range of about 10 cP to about 150 cP, alternately in the range of about 10 cP to about 200 cP, alternately in the range of about 10 cP to about 250 cP, alternately in the range of about 10 cP to about 300 cP, and alternately in the range of about 10 cP to about 350 cP. The precursor viscosity of the geopolymer precursor fluid controls the ability to pump (or pumpability) of the geopolymer precursor fluid. The precursor viscosity impacts the leakoff rate of the geopolymer precursor fluid into the formation and therefore, the point of fracturing the rock.

The geopolymer precursor fluid is pumped into the reservoir at the fracture pressure. Any pumping mechanism capable of pumping the geopolymer precursor fluid into the reservoir at the fracture pressure can be used. The fracture pressure is a pressure above the overburden pressure and provides the force to fracture the reservoir with the geopolymer precursor fluid.

The fractures generated during the step of pumping the geopolymer precursor fluid into the reservoir have a fracture width. The fracture width is between about 0.005 feet (0.001524 meters) to about 0.05 feet (0.01524 meters), alternately between about 0.01 feet (0.003048 meters) to about 0.04 feet (0.012192 meters), and alternately between about 0.01 feet (0.003048 meters) to about 0.03 feet (0.009144 meters).

During fracturing, the geopolymer precursor fluid is continuously pumped through the wellbore into the reservoir. The geopolymer precursor fluid fills the fractures. Pumping the geopolymer precursor fluid into the reservoir and fracturing continues for a fracturing time. At the conclusion of the fracturing time, the wellbore is shut-in at a wellbore pressure. The wellbore pressure is a pressure to maintain the geopolymer precursor fluid in the fractures or substantially in the fractures, without forcing the fluid into the reservoir rock or creating new fractures. The wellbore is shut-in at the wellbore pressure for a hardening time.

The geopolymer precursor fluid hardens for the hardening time to form the geopolymer. The hardening time is influenced by the reservoir temperature. As the reservoir temperature increases, the rate of geopolymerization increases. An increase in the rate of geopolymerization decreases the hardening time. The hardening time can be in the range of between about 20 minutes and about 10 hours, alternately between about 20 minutes and about 1 hour, alternately between 1 hour and about 8 hours, alternately between about 1 hour and about 2 hours, alternately between about 2 hours and about 8 hours, alternately between about 4 hours and about 6 hours, alternately between about 4 hours and about 8 hours. In a preferred embodiment, the hardening time is in the range of between about 4 hours and about 8 hours.

The hardening time can be prolonged through the use of retarders. "Prolonged" as used herein means the hardening time is longer with the use a retarder than in the absence of a retarder. Retarders allow for the control of the hardening time. Exemplary retarders include a dibasic acid and an alkali metal salt, sucrose in 1.5% to 2.5% sucrose solutions, cesium nitrate, cesium sulfate, strontium nitrate, and strontium sulfate. In at least one embodiment of the present invention, the hardening time can be prolonged by increasing the ratio of $SiO_2/Al_2O_3$ in the geopolymer precursor fluid. Increasing the ratio of $SiO_2/Al_2O_3$ for a given reservoir temperature and reservoir pressure can prolong the hardening time. The hardening time can be prolonged by a range of between 30 minutes and 8 hours, alternately between about 30 minutes and about 1 hour, alternately between about 1 hour and about 2 hours, alternately between about 2 hours and about 12 hours, alternately between about 4 hours and about 10 hours, and alternately between about 6 hours and about 8 hours. In at least one embodiment of the present invention, the hardening time can be increased to a total hardening time of between about 5 hours to about 12 hours based on retarder concentration and reservoir temperature. The retarder can be in the range of about 1% by weight to about 5% by weight of the total weight of the geopolymer precursor fluid.

In at least one embodiment of the present invention, an accelerator is needed to advance the hardening time. "Advance" as used herein with respect to hardening time means that the hardening time is reduced or shorter with the use of an accelerator than it would have been in the absence of an accelerator. Accelerators allow for the control of the hardening time, by controlling the amount of time needed for the geopolymer precursor fluid to harden into the geopolymer, by reducing the amount of time needed to harden. Exemplary accelerators include citric acid (1.5% and 2.5% solutions citric acid), cesium hydroxide, and strontium hydroxide. The hardening time can be advanced by a range of between 30 minutes and 4 hours, alternately between about 30 minutes and about 1 hour, alternately between about 1 hour and about 2 hours, alternately between about 1 hours and about 4 hours, alternately between about 2 hours and about 4 hours, and alternately between about 3 hours and about 4 hours. In at least one embodiment of the present invention, the hardening time can be advanced to between about 3 to 4 hours based on accelerator concentration and reservoir temperature. The accelerator can be in the range of about 1% by weight to about 5% by weight of the total weight of the geopolymer precursor fluid.

The geopolymer of the present invention has a geopolymer matrix. The geopolymer matrix is due to an amorphous three-dimensional framework structure. The three-dimensional framework structure consists of silica oxide ($SiO_4$) and $AlO_4$ tetrahedral linked alternately through the oxygen. The structure of the geopolymer matrix dictates the properties of strength, hardness, and compressibility of the geopolymer. The alkali cations are associated with the aluminum, where the $AlO_4$ group has a single negative charge due to the aluminum ($Al^{3+}$) being in the tetrahedral coordination, thus the alkali cations balance the aluminum. Exemplary cations include $Na^+$, $K^+$, and $Ca^{2+}$.

The geopolymer matrix of the geopolymer has channels and void spaces. The channels and void spaces make the geopolymer matrix permeable to reservoir fluids. The geopolymer matrix has a natural permeability on the nanoporosity level. In at least one embodiment of the present invention, the geopolymer matrix of the geopolymer has channels and void spaces comparable to sandstone reservoirs. A permeability enhancer can be added to increase the permeability of the geopolymer matrix. In at least one embodiment of the present invention, the porosity of the geopolymer matrix with a permeability enhancer can be up to 30% of the geopolymer. In at least one embodiment of the present invention, the porosity of the geopolymer matrix is 1% of the created fracture volume of the reservoir.

An average pore size in the geopolymer matrix of the geopolymer of the present invention is in the range of about 10 microns to about 45 microns in diameter. In at least one embodiment of the present invention, average pore size can be measured using scanning electron miscroscopy (SEM) or transmission electron microscopy (TEM) to image the surface and then calculate the pore size and the pore size distribution based on the image. In at least one embodiment of the present invention, average pore size can be measured by mercury injection. The pores can be connected to provide permeability to the geopolymer. Therefore, the larger the pores, the higher the permeability of the geopolymer. The geopolymer matrix with a permeability enhancer has a permeability of greater than 0.1 mD, alternately in the range between about 0.1 mD and about 2,000 mD, alternately in the range between about 0.1 mD and about 100 mD, alternately in the range between 100 mD to 2,000 mD, alternately in the range between about 10 mD and 500 mD.

The permeability of the geopolymer matrix can be increased through permeability enhancers. Any permeability enhancer that creates void spaces in the geopolymer matrix is suitable for use in the present invention. Exemplary permeability enhancers include fibers that decompose under the reservoir temperature and reservoir pressure, a water soluble material that dissolves as water percolates through the geopolymer matrix, chemicals that react to create gas and/or foam within the geopolymer precursor fluid prior to hardening, vegetable oil and combinations thereof. The permeability enhancer is added with the amount of aluminosilicate and the amount of alkaline reagent during the step of mixing to create the geopolymer precursor fluid, thus the permeability enhancer is a component of the geopolymer precursor fluid. In at least one embodiment of the present invention, polylactic acid fibers that dissolve at reservoir temperature and reservoir pressure are added to the geopolymer precursor fluid as the permeability enhancer. In at least one embodiment of the present invention, chemicals of aluminum and zinc along with an alkali metal hydroxide that react to produce hydrogen are added to the geopolymer precursor fluid as the permeability enhancer. In at least one embodiment of the present invention, hydrogen peroxide and sodium perborate that react to generate oxygen are added to the geopolymer precursor fluid as the permeability enhancer. In at least one embodiment of the present invention, the use of silica fume or silicon carbides, that contain silicon metal that reacts to generate hydrogen is added to the geopolymer precursor fluid as the permeability enhancer.

In at least one embodiment of the present invention, the permeability of the geopolymer matrix is greater than the permeability of the reservoir.

The geopolymer has a compressive strength. The geopolymer is designed to have a compressive strength sufficient to withstand the closure pressure (also known as the overburden pressure) of the reservoir. The compressive strength of the geopolymer keeps the fractures open and conductive. The compressive strength can be controlled by tuning the Si/Al ratio of the geopolymer. In at least one embodiment of the present invention, increasing the Si/Al ratio in the geopolymer results in a decrease in Si—O—Al bonds and an increase in Si—O—Si bonds, where such a relative increase/decrease can cause the compressive strength of the geopolymer to increase. The compressive strength of the geopolymer can be in the range between about 3,000 psi and about 25,000 psi, alternately in the range between about 3,000 psi and about 5,000 psi, alternately in the range between about 5,000 psi and about 10,000 psi, alternately in the range between about 10,000 psi and about 15,000 psi, alternately between about 15,000 psi and about 20,000 psi, and alternately between about 20,000 psi and about 25,000 psi.

In at least one embodiment of the present invention, the compressive strength can be modified with the use of fibers. The fibers are mixed with the geopolymer precursor fluid at the surface. Exemplary fibers include basalt fiber, polypropylene fiber, natural flax fiber, steel fiber, other polymer fibers, and combinations thereof. In at least one embodiment of the present invention, the fibers are ¼ inch long basalt fibers. In at least one embodiment of the present invention, the fibers are ½ inch long basalt fibers. Without being bound to a particular theory it is believed that the fibers increase the flexural strength of geopolymers. Flexural strength is a material's ability to withstand tensile stress and compression due to a load that exerts both.

In at least one embodiment of the present invention, the geopolymer is in the absence of hydraulic cement. In at least one embodiment of the present invention, the geopolymer is in the absence of Portland cement. Geopolymers emit less than 20% of the carbon dioxide emitted by the production and use of Portland cement. In at least one embodiment of the present invention, the geopolymer is more acid-resistant than cement. In at least one embodiment of the present invention, the geopolymer has higher mechanical strength than cement. In at least one embodiment of the present invention, the geopolymer has better resistance to freeze-thaw cycles than cement. The method of the present invention uses less volume of water than traditional fracturing methods. In at least one embodiment of the present invention, the geopolymer precursor fluid is in the absence of fluid loss control additive.

The pores of the geopolymer matrix can be clogged by asphaltenes or sand. In at least one embodiment of the present invention, a solvent or asphaltene inhibitor can be added to the reservoir to ease the passage of asphaltenes through the geopolymer matrix. In at least one embodiment of the present invention, screens can be employed to prevent sand from clogging the pores of the geopolymer matrix.

According to the method of the present invention, the geopolymer generates in situ to prevent fracture closure. In this way, the proppant—the geopolymer—generates in situ, and is in the absence of being carried to the fractures (as a formed proppant).

In at least one embodiment of the present invention, the geopolymer can be used to case a well. In methods where the geopolymer is used in casing a well, the permeability of the geopolymer matrix can be designed to have a permeability of less than 0.1 mD and alternately to have a permeability between 1 nD and 5 nD. In embodiments where the geopolymer is used in casing a well, the permeability of the geopolymer should be low, lower than the permeability desired when the geopolymer is used in a fracturing fluid, as in a method to fracture a well. Low permeability is desired when used in a casing application to prevent fluid flow behind the casing to the surface and to reduce the risk of explosions or fires. In fracturing applications, the permeability is greater to allow fluid flow through the fractured areas to the production well. The length of time the geopolymer precursor fluid is pumped (pumping rate) and the hardening time for casing applications can be the same as in the fracturing applications. Both applications require that the geopolymer is a liquid (geopolymer precursor fluid) as it is being pumped into the well, then hardens after it reaches its final destination within the production well (casing applications) or the reservoir (fracturing applications).

Although the present invention has been described with respect to certain features, it should be understood that the features and embodiments of the features can be combined with other features and embodiments of those features.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that the mere use of the term "first" and "second" does not require that there be any "third" component, although that possibility is contemplated under the scope of the present invention.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

What is claimed is:

1. A method of fracturing a reservoir, the method comprising the steps of:
    pumping a geopolymer precursor fluid through a wellbore into the reservoir at a fracture pressure, wherein the geopolymer precursor fluid at the fracture pressure generates fractures in the reservoir, wherein the geopolymer precursor fluid comprises an amount of aluminosilicate, wherein the aluminosilicate is metakaolin, an amount of alkaline reagent, and a permeability enhancer;
    allowing the geopolymer precursor fluid to fill the fractures in the reservoir;
    shutting-in the wellbore at a wellbore pressure, wherein the wellbore pressure is operable to maintain the geopolymer precursor fluid in the fractures;
    allowing the geopolymer precursor fluid to harden for a hardening time to form a geopolymer in the fractures, wherein the geopolymer has a geopolymer matrix, wherein the geopolymer matrix has a permeability, wherein the geopolymer has a compressive strength, wherein the geopolymer does not comprise hydraulic cement; and
    reducing the wellbore pressure, wherein reducing the wellbore pressure is operable to allow a reservoir fluid to flow from the reservoir through the geopolymer matrix of the geopolymer to the wellbore.

2. The method of claim 1, wherein the amount of alkaline reagent is an alkaline reagent selected from the group consisting of sodium silicate solution and potassium silicate solution.

3. The method of claim 1, wherein the permeability enhancer is polylactic acid fiber.

4. The method of claim 1, wherein the geopolymer precursor fluid further comprises an accelerator, the accelerator operable to advance the hardening time.

5. The method of claim 1, wherein the geopolymer precursor fluid further comprises a retarder, the retarder operable to prolong the hardening time.

6. The method of claim 1, wherein the compressive strength is greater than an overburden pressure of the reservoir.

7. The method of claim 6, wherein the compressive strength is in the range between 3,000 psi and 20,000 psi.

8. The method of claim 1, wherein the permeability is in the range of 0.1 mD to 2,000 mD.

9. A method of generating a geopolymer with a geopolymer matrix in situ in fractures in a reservoir, the method comprising the steps of:
    mixing an amount of aluminosilicate and an amount of alkaline reagent to form a geopolymer precursor fluid, wherein the aluminosilicate is metakaolin, wherein the geopolymer precursor fluid has a precursor viscosity, wherein the geopolymer precursor fluid has an Si to Al ratio;
    pumping the geopolymer precursor fluid through a wellbore into the reservoir at a fracture pressure to generate the fractures in the reservoir, wherein the geopolymer precursor fluid is operable to fill the fractures;

allowing the geopolymer precursor fluid to harden for a hardening time to form the geopolymer in the fractures, the geopolymer having the geopolymer matrix, wherein the geopolymer matrix has a permeability, wherein the geopolymer has a compressive strength, wherein the geopolymer does not comprise hydraulic cement, wherein the geopolymer precursor fluid is not pumped into the reservoir during the hardening time; and reducing a wellbore pressure in the wellbore, wherein reducing the wellbore pressure is operable to allow reservoir fluids to flow from the reservoir through the geopolymer matrix of the geopolymer to the wellbore.

10. The method of claim 9, wherein the Si to Al ratio is in the range between 0.5:1 and 2:1.

11. The method of claim 9, wherein the precursor viscosity is in the range between 10 cP and 400 cP.

12. The method of claim 9, wherein the geopolymer precursor fluid further comprises an accelerator, the accelerator operable to advance the hardening time.

13. The method of claim 9, wherein the geopolymer precursor fluid further comprises a retarder, the retarder operable to prolong the hardening time.

14. The method of claim 9, wherein the permeability is in the range of 0.1 mD to 2,000 mD.

15. The method of claim 9, wherein the compressive strength is greater than an overburden pressure of the reservoir.

16. The method of claim 15, wherein the compressive strength is in the range between 3,000 psi and 20,000 psi.

17. The method of claim 9, wherein the geopolymer precursor fluid further comprises a permeability enhancer.

18. The method of claim 17, wherein the permeability enhancer is polylactic acid fibers.

19. The method of claim 9, wherein the amount of alkaline reagent is an alkaline reagent selected from the group consisting of sodium silicate solution and potassium silicate solution.

* * * * *